United States Patent [19]
Lecorvaisier et al.

[11] Patent Number: 5,486,033
[45] Date of Patent: Jan. 23, 1996

[54] SUPPORT SHAFT FOR A VEHICLE SUN VISOR

[75] Inventors: René Lecorvaisier, Hombourg-Haut; Christian Buchheit, Ham Sous Vasberg, both of France

[73] Assignee: Gebr. Happich GmbH, Germany

[21] Appl. No.: 316,858

[22] Filed: Oct. 3, 1994

[30] Foreign Application Priority Data

Nov. 13, 1993 [DE] Germany .......................... 43 38 860.4

[51] Int. Cl.⁶ ...................................... B60D 3/00
[52] U.S. Cl. .......................... 296/97.13; 362/144
[58] Field of Search ............................ 296/97.12, 97.13; 362/144, 74, 142

[56] References Cited

U.S. PATENT DOCUMENTS

| | | | |
|---|---|---|---|
| 4,533,275 | 8/1985 | Foggini | 296/97.13 X |
| 4,591,956 | 5/1986 | Majchrzak | 362/144 |
| 4,756,570 | 7/1988 | Cooper . | |
| 5,031,954 | 7/1991 | Peterson et al. . | |
| 5,082,322 | 1/1992 | Cekander et al. . | |
| 5,299,106 | 3/1994 | Buchheit et al. | 296/97.13 X |

FOREIGN PATENT DOCUMENTS

| | | |
|---|---|---|
| 0575592 | 12/1993 | European Pat. Off. . |
| 0399368 | 4/1994 | European Pat. Off. . |
| 1961893 | 3/1967 | Germany . |
| 7149241 | 4/1972 | Germany . |
| 2627974 | 5/1977 | Germany . |
| 3910811 | 10/1990 | Germany . |
| 4118913 | 11/1992 | Germany . |
| 0677642 | 6/1976 | U.S.S.R. . |
| 2046198 | 11/1989 | United Kingdom . |

Primary Examiner—Joseph D. Pape
Attorney, Agent, or Firm—Ostrolenk, Faber, Gerb & Soffen

[57] ABSTRACT

An L-shaped support shaft for a sun visor body including a first support arm received in a mounting bracket on the vehicle body and a second longer support arm that extends into a mounting housing of a sun visor body and is held there by detent spring. The support shaft may comprise a metal or steel tube. A flat on the longer second arm receives the detent spring of the mounting housing. The free end region of the first short arm has a smaller diameter than the rest of the support shaft. A sprayed on plastic body over the bend of the L-shaped support shaft and extending up both of the arms, toward but not over the free end region of the first arm and toward but not over the flat of the second arm. At the first arm, the plastic body defines a mounting shank terminating in a mushroom head toward the free end. Electrical connection contacts are disposed over the long arm. A conductor wire extends through the support shaft from the free end region of the first arm to the contact on the second arm.

10 Claims, 2 Drawing Sheets

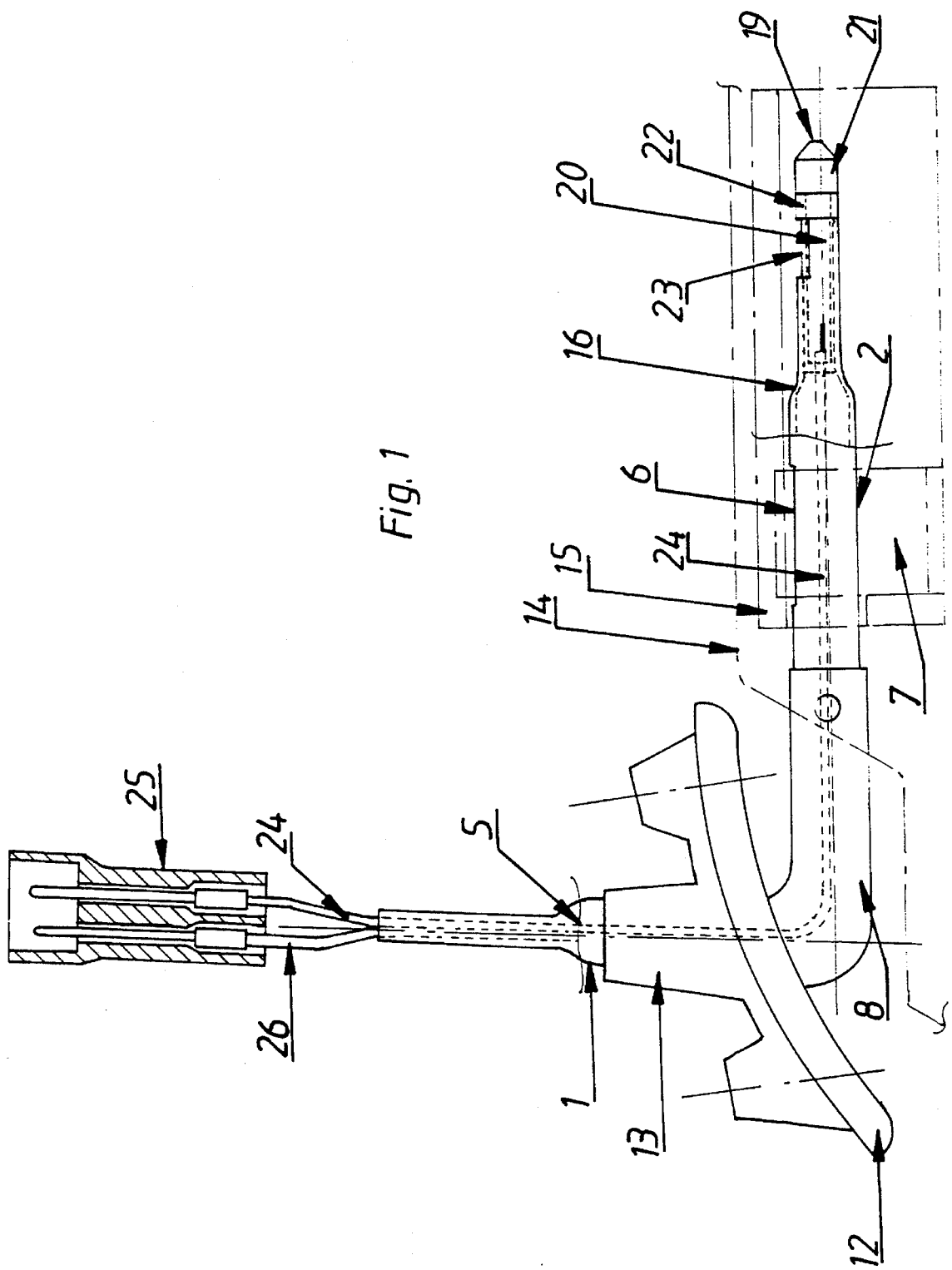

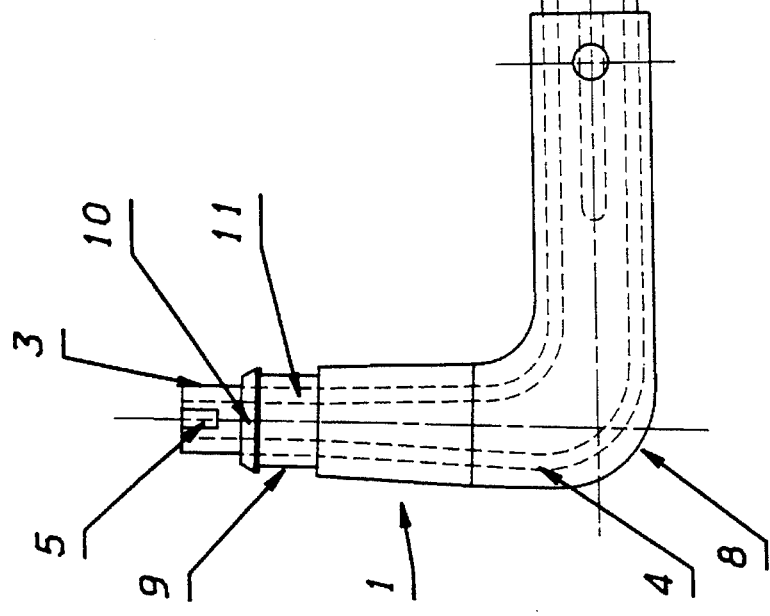

SUPPORT SHAFT FOR A VEHICLE SUN VISOR

BACKGROUND OF THE INVENTION

1. Field of the Invention

The present invention relates to an L-shaped support shaft for a vehicle sun visor. It includes one short shaft arm which is rotatably supported in a bearing bracket adapted to be fastened to the body of the vehicle. It includes another, long shaft arm which forms the axis of swing of the sun visor body and is turnably mounted in a mounting housing arranged in the body of the sun visor.

2. Description of the Related Art

A support shaft of this type has traditionally been made from a solid steel bar. For some time, however, for reasons of weight and price reduction, a plastic material has been used for producing the support shaft and the support shaft has been developed as a plastic injection molding. Support shafts of plastic, however, have not proven absolutely suitable. In vehicles which are repainted, for example, the mounted sun visors ordinarily remain in their mounted position on the vehicle, particularly in their position of non-use, i.e. resting under initial stress against the ceiling of the vehicle. The plastic material can soften in the repainting kiln, which reaches temperature of about 80° C. The detent position of the sun visor can turn against the ceiling, due to the initial stressing of the sun visor against the roof of the vehicle. Initial tension is lost by the change in position, causing the extremely unpleasant result that chatter noises can now occur.

SUMMARY OF THE INVENTION

The object of the present invention is, therefore, to improve the quality of and to make available to customers a support shaft of the aforementioned type which, in its mounted condition, does not differ in appearance from previous support shafts but which assures that, even upon the repainting of a vehicle, the initial tension of the sun visor against the ceiling of the vehicle will not be lost.

In order to achieve this object, according to the invention, the support shaft essentially comprises a metal, particularly a steel, tube which, in the region of the long shaft arm, has a flat which can be acted on by a detent spring arranged on the mounting housing of the sun visor body. This holds the sun visor body resting with initial stress against the ceiling of the vehicle when the visor is not in use. A free end region of the short shaft arm has a diameter which is substantially less than the diameter of the rest of the support shaft. In the region of its bend, the support shaft bears a plastic body which is applied to it by spraying. The plastic body extends over a partial axial region of the long shaft arm but terminates before the flat. The plastic body also extends over the short shaft arm up to shortly before its free end, to develop there a support shaft which terminates in a mushroom head.

These measures according to the invention have the advantage that the support shaft has a non-changeable detent surface for the detent spring, which is formed by the flat and it remains non-changeable even when it is acted on by large changes in temperature. Sagging of the sun visor body and a loss of the initial stress which counteracts chatter noise are now no longer possible. In this connection, the plastic body which is applied by spraying terminates in front of the flat. If the plastic body were to also extend over the flat on the metal so that the plastic body would instead have a flat, the previous problems could arise. The short shaft arm should also have a region of reduced diameter, which enables the plastic body with its support shaft to be brought to a size which corresponds to the dimensions of the mounting hole in the bearing bracket. This enables existing bearing brackets to still be used without requiring expensive changes. When the support shaft is mounted in the mounting bracket and in the mounting housing of the sun visor body, only the plastic body remains visible, so that the support shaft of the invention does not differ in appearance from traditional support shafts, whereby desires of the customers can be taken into account.

In a further development of the invention, the flat is developed as an impressed zone. This increases the stability of the support shaft of the invention.

A sun visor for a motor vehicle is frequently provided with a make-up mirror and an illuminating device which permits use of the mirror even in the dark. In order now to be able to use the support shaft of the invention advantageously for a sun visor having an illuminating device, the free axial end region of the long shaft arm may have, according to a preferred embodiment of the invention, a substantially smaller diameter than the diameter of the rest of the support shaft. A freely ending radial opening is provided on the end region of the shaft arm of reduced diameter.

There is inserted in the end regions of the long shaft arm a contact element which has a cylindrical shank and a cylindrical head. The shank supports a first insulating sleeve which is arranged between the free end of the long shaft arm and the head of the contact element and supports a second insulating sleeve which separates the shank from the inner wall of the long shaft arm. The contact element is connected in an electrically conductive manner with a bared end of an insulated conductor wire which is passed through the support shaft. The conductor wire at the free end of the short shaft arm is electrically connected to a ground connection line.

These measures create a support shaft which connects between the illuminating device and the current supply network of a vehicle in a simple and failure proof manner. In this connection the support shaft also forms a switch of extremely simple construction which can be actuated only by movement of the sun visor body. The reduction in diameter of the end region of the support shaft permits the use of contact elements of small dimension. As a result, the sun visor body can again be made relatively thin, as is desired by the customers.

Other features and advantages of the present invention will become apparent from the following description of the invention which refers to the accompanying drawings.

BRIEF DESCRIPTION OF THE DRAWINGS

One embodiment of the invention is explained in further detail below with reference to the drawing, in which:

FIG. 1 shows the support shaft with mounting bracket mounted and the sun-visor body indicated;

FIG. 2 is an enlarged view of the support shaft of FIG. 1; and

FIG. 3 is a section along the line III—III of FIG. 2.

DETAILED DESCRIPTION OF THE PREFERRED EMBODIMENT

The support shaft for a sun visor is comprised of an L-shaped, chrome plated, steel tube. The shaft has a first short shaft arm 1 and a second long shaft arm 2 perpendicular to the short arm 1. The short shaft arm 1 has a free end region 3 of a diameter which is substantially less than the diameter of the rest of the support shaft. The shaft arm end region 3 is tapered in diameter away from a bent zone 4 and extends over a substantial region of the axial length of the short shaft arm 1. The support shaft can have an unreduced diameter of about 8 mm and a reduced diameter in the end region 3 of about 5.5 mm. There is a slot opening 5 at the free end of the short shaft arm.

The long shaft arm 2 is developed over an essential region of its axial length with a larger, i.e. unchanged, diameter of, for instance, 8 mm. Along part of this longitudinal region, a flat 6 is developed for being acted upon by a detent spring 7, which is indicated in dashed line in FIG. 1. The flat comprises an impressed zone which retains the thickness of the wall of the tube and extends, for instance, over an axial length of 17.5 mm.

Generally in and around its angular region, the support shaft has a plastic body 8 which is applied to the shaft by being sprayed on and which extends both over a partial axial region of the long shaft arm 2 and a partial axial region of the short shaft arm 1. The plastic body 8 terminates along the long shaft arm 2 at a distance in front of the flat 6 so that the body 8 does not interfere with cooperation between the metal part of the shaft arm and the flat 6 with the detent spring 7. The plastic body 8 terminates on the short shaft arm 1 before its end and thus leaves at least the slot opening 5 free. The end region of the plastic body 8 on the short shaft arm 1 is developed as a mounting shank 9 with a mushroom shaped head 10 on its end. Between the mounting shank 9 and the rest of the plastic body 8, there is an annular shoulder 11. The short shaft arm 1 can be mounted on a bearing bracket 12 which is adapted to be fastened to the body of a car. The dome 13 of the bracket is seated, after mounting, between the mushroom head 10 and the annular shoulder 11, while the mounting shank is rotatably received rotatably in the mounting hole in the bearing bracket 12.

The long shaft arm 2 of the support shaft serves as an axis of swing for the sun-visor body 14, which is indicated in dashed line in FIG. 1. The shaft arm is therefore turnably supported in a mounting housing 15 which is arranged in the sun-visor body 14 and it also bears the detent spring 7.

The support shaft of the invention is preferably developed such that it can be used for sun visors both without and with an illuminating device. For this reason, the long shaft arm 2 also has a free end region 17 of substantially smaller diameter than the rest of the support shaft which adjoins the bent zone 16. The diameter of the region 17 corresponds approximately to the diameter of the free end region 3 on the short shaft arm 1. On the free end region 17, there is a free ending radial opening 18 which can be formed by milling.

If the support shaft for a sun visor is to be provided with an illuminating device, a contact element 19 which has a cylindrical shank 20 and a cylindrical head 21 is provided in the end region 17 of the long shaft arm 2. A first insulating sleeve 22 is pushed on over the shank 20 to lie between the free end of the long shaft arm 2 and the head 21 of the contact 19. A second insulating sleeve 23, which separates the shank 20 from the inner wall of the long shaft arm 2, is also pushed on over the shank 20. An electrically insulated conductor 24 is passed through the support shaft, is then bared at its end, and is soldered to the free end of the shank. It is advisable to provide a blind hole on the free end of the shank to receive the bared end of the conductor. The other end of the electric conductor 20 extends out of the short shaft arm 1 and is connected to a plug housing unit 25. A second electric conductor 26 which serves as a ground connection is also connected to the plug housing unit 25. Its other end engages into the slot opening 5 and is soldered there.

A contact element which forms part of the illuminating device of the sun visor can now be connected permanently to the head 21 of the contact element 19, while a ground connection is produced by a second contact element only when the corresponding contact element rests in contact-forming manner on the region 17 of the shaft arm outside the radial opening 18. The current is interrupted when the second contact element comes against the insulating sleeve 23 upon the swinging of the sun-visor body 14.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A support shaft assembly for a sun visor of a vehicle, the vehicle having a ceiling provided with a bearing bracket for receiving the support shaft assembly, the sun visor having a body with a mounting housing formed therein, the mounting housing having a detent spring disposed thereon, the sun visor body being pivotable around a swing axis extending axially through the mounting housing, the support shaft assembly comprising:

an L-shaped support shaft having a diameter, the support shaft including:
  a short arm having a free end, the free end having a diameter smaller than the diameter of the shaft, the short arm being receivable within the bearing bracket disposed on the vehicle;
  a long arm adapted to be received within the mounting housing along the swing axis of the sun visor body, such that the sun visor body is rotatable around the long arm, the long arm including a flat for receiving the detent spring so that the sun visor body rests against the ceiling of the vehicle when the sun visor is not in use, the long arm further including a free axial end provided with a radial opening; and
  a bend joining the short arm and the long arm; and
  a plastic body formed over the bend of the support shaft, the plastic body including:
  a first end disposed over the short arm of the support shaft and terminating before the free end of the short arm, the first end of the plastic body having a mounting shank formed thereon for mounting the support shaft to the bearing bracket; and
  a second end disposed over the long arm of the support shaft and terminating before the flat of the long arm.

2. The support shaft of claim 1, wherein the mounting shank portion of the plastic body includes a mushroom head located where the first end of the plastic body terminates.

3. The support shaft of claim 2, wherein:
the free axial end of the long arm has a diameter which is substantially less than the diameter of the rest of the support shaft;
a contact element is inserted in the free axial end of the long arm, the contact element having a cylindrical shank on the long arm and having a head outward toward the free axial end;
a first insulating sleeve is disposed between the free end of the long arm and the head of the contact element;
a second insulating sleeve is positioned for separating the shank from the inner wall of the long arm; and a conductor wire with a bared end is passed through the support shaft, and the contact element is electrically conductively connected with the bared end of the conductive wire.

4. The support shaft of claim 1, wherein the support shaft is comprised of a metal tube.

5. The support shaft of claim 1, wherein the flat in the long arm is developed as an impressed zone in the long arm.

6. The support shaft of claim 1, wherein the support shaft is comprised of a steel tube.

7. The support shaft of claim 1, wherein the plastic body is applied to the bend of the support shaft by being sprayed thereon.

8. The support shaft of claim 1, wherein:

the free axial end of the long arm has a diameter which is substantially less than the diameter of the rest of the support shaft;

a contact element is inserted into the end region of the long arm, the contact element having a cylindrical shank of the long arm and having a head outward toward the free end region;

a first insulating sleeve is disposed between the free end of the long arm and the head of the contact element;

a second insulating sleeve is positioned for separating the shank from the inner wall of the long arm; and a conductor wire with a bared end is passed through the support shaft, and the contact element is electrically conductively connected with the bared end of the conductive wire.

9. The support shaft of claim 8, wherein the free end region of the short shaft arm is connected in an electrically conductive manner with a ground connection line and is further connected with the conductor wire extending through the support shaft.

10. A sun visor for a vehicle, the vehicle having a ceiling provided with a bearing bracket for supporting the sun visor, the sun visor comprising:

a sun visor body having a mounting housing therein and a detent spring in the mounting housing on the sun visor body; and an L-shaped support shaft having a diameter, the support shaft including:

a short arm having a free end, the free end having a diameter smaller than the diameter of the shaft, the short arm being receivable within the bearing bracket disposed on the vehicle;

a long arm received within the mounting housing along the swing axis of the sun visor body, such that the sun visor body is rotatable around the long arm, the long arm including a flat receiving the detent spring so that the sun visor body rests against the ceiling of the vehicle when the sun visor is not in use, the long arm further including a free axial end provided with a radial opening; and a bend joining the short arm and the long arm; and a plastic body formed over the bend of the support shaft, the plastic body including:

a first end disposed over the short arm of the support shaft and terminating before the free end of the short arm, the first end of the plastic body having a mounting shank formed thereon for mounting the support shaft to the bearing bracket; and a second end disposed over the long arm of the support shaft and terminating before the flat of the long arm.

* * * * *